United States Patent [19]
Golden

[11] 3,725,207
[45] Apr. 3, 1973

[54] DISTILLATION OF A HALOALKYL-CYANIDE WITH A NITRILE

[75] Inventor: Richard L. Golden, Oradell, N.J.

[73] Assignee: Halcon International, Inc., New York, N.Y.

[22] Filed: May 27, 1970

[21] Appl. No.: 41,091

[52] U.S. Cl. .................. 203/6, 203/60, 260/465.7, 260/465.8
[51] Int. Cl. .................. B01d 3/34, C07c 121/06
[58] Field of Search ....... 203/6, 60; 260/465.7, 465.8

[56] References Cited

UNITED STATES PATENTS

| | | | |
|---|---|---|---|
| 3,527,787 | 9/1970 | Baader et al. | 260/465.7 |
| 3,536,747 | 10/1970 | Mathis et al. | 260/465.8 |
| 2,390,470 | 12/1945 | Sumner | 260/465.7 |
| 2,524,020 | 9/1950 | Moss | 260/465.7 |

*Primary Examiner*—Wilbur L. Bascomb, Jr.
*Attorney*—William C. Long, David Dick and Michael I. Wolfson

[57] ABSTRACT

Alkylene nitriles having the formula $X-CH_2-CHR-CN$ may be purified by distillation by maintaining a concentration of 1 to 5 mol percent of $CH_2=CRCN$ in the distillation zone during the distillation. R may be hydrogen or a lower alkyl and X a chloro-, iodo- or bromo-group.

4 Claims, No Drawings

DISTILLATION OF A HALOALKYL-CYANIDE WITH A NITRILE

This invention relates to the purification of crude haloalkyl cyanides, as for example, 3-bromopropionitrile. More specifically, it teaches the distillation of haloalkyl cyanides, in the presence of unsaturated nitriles.

Alkylene dinitriles, such as adiponitrile, may be advantageously prepared by the reductive coupling of haloalkyl cyanides. This reaction is fully described in copending U.S. application Ser. No. 872,395, filed Oct. 29, 1969.

The reaction product obtained from the aforesaid reaction, using as illustrative the preparation of adiponitrile, consists of acrylonitrile, a halopropionitrile, adiponitrile, high boiling by-products and a metal halide. These various components are separated by a series of distillation steps to recover the adiponitrile, unreacted halo-propionitrile, and recyclable by-product values. Unfortunately, under conventional distillation conditions, only a limited amount of the unreacted halo-propionitrile can be recovered because the halo-propionitrile decomposes. The decomposition products are of comparatively little value.

It has been discovered that the haloalkyl cyanides can be purified by distillation, with a minimal amount of decomposition, by maintaining at least 1 mol, preferably from 1 to 5 moles, of an unsaturated nitrile for every one hundred moles of haloalkyl cyanide in the distillation zones.

The haloalkyl cyanides which can be purified according to the invention have the formula: $X-CH_2-CHR-CN$ wherein X is iodine, bromine, or chlorine and R is hydrogen or a lower alkyl having one to four carbon atoms. These include 3-bromopropionitrile, 3-chloropropionitrile, 3-iodopropionitrile, 3-bromo-2-methylpropionitrile, 3-chloro-2-methylpropionitrile and 3-iodo-2-propylpropionitrile.

The unsaturated nitriles have the formula $CH_2=CR-CN$, where R is hydrogen or a lower alkyl having one to four carbon atoms. Examples of these include acrylonitrile, methacrylonitrile and alpha-propyl acrylonitrile. The unsaturated nitrile added to the distillation zone should correspond to the haloalkyl cyanide, i.e., the former should have the same number of carbon atoms as the latter. Therefore, it is preferred to add acrylonitrile to enhance the distillation of 3-bromopropionitrile.

Where the haloalkyl cyanide is obtained by the hydrobromonation of the corresponding unsaturated nitrile, or is separated from the product of the reductive coupling described in the aforesaid U.S. patent application, the crude product may already contain some of the unsaturated nitrile. This, of course, will minimize the amount of unsaturated nitrile which need be added. If a batch distillation is employed, the unsaturated nitrile must be added to the column to maintain the minimum required amount. Where the crude material already contains a significant quantity of the unsaturated nitrile, makeup material need only be added after the initial period of the distillation as the unsaturated nitrile content decreases below a selected percentage of the material in the column. The make-up material may be added at a constant or variable rate or in periodic "slugs" during the distillation.

Alternatively, the purification may be performed continuously and the necessary unsaturated nitrile may be introduced with or as part of the crude material, or may be introduced at a lower point in the column than the feed.

In order to illustrate more fully the instant invention attention is directed to the following examples:

COMPARATIVE EXAMPLE A

Crude 3-bromopropionitrile was prepared by bubbling HBR into acrylonitrile in a vessel maintained at 10° – 15°C. and stopping the reaction before all the acrylonitrile had been consumed. The crude 3-bromopropionitrile contained 1.4% by weight of acrylonitrile.

12.2 Kg of the crude 3-bromopropionitrile was charged to a round-bottomed flask and distilled using a 2" diameter, 20 plate "Oldershaw" column. Distillation was carried out at a pressure of 10 mm Hg and a reflux ratio of 3 to 1 until a head temperature of 78°C. was reached. At this point, a forecut of 142 g which contained essentially all of the acrylonitrile in the distillation charge had been collected.

The reflux ratio was charged to one-third and the first 50 cc of distillate was added to the forecut.

The heartcut of pure 3-bromopropionitrile was then collected. After 2 hours, 110 g of heartcut had been distilled, evolution of non-condensible gases occurred, causing the pressure and the temperature to rise. Yellow-white solids precipitated in the stillpot. It was not possible to continue the distillation. The yield of pure 3-bromopropionitrile from crude 3-bromopropionitrile was only 17.3 percent.

EXAMPLE 1

Crude 3-bromopropionitrile containing 2 percent acrylonitrile was distilled in the vacuum system of Example A except that the crude 3-bromopropionitrile instead of being added to the stillpot all at once, was fed continuously. This mode of operation insures that some acrylonitrile is always present in the stillpot and throughout the distillation column.

Distillation conditions were as follows:

| | |
|---|---|
| Reflux ratio | = ⅓ |
| Head pressure | = 8 mm Hg |
| Head temperature | = 65° – 69°C. |
| Pot temperature | = 103° – 106°C. |

A total of 29.55 kg of crude 3-bromopropionitrile was fed over a 30 hour period. There was no problem in maintaining vacuum nor was there any solids formation. The yield of pure 3-bromopropionitrile was 87 percent.

EXAMPLE 2

To a series of four agitated coupling reactors is fed a stream of the following composition:

| Component | Mols/hr |
|---|---|
| Acrylonitrile | 500 |
| Propionitrile | 6476 |
| 3-bromopropionitrile | 1285 |
| Copper | 667 |
| Cuprous bromide | 71 |
| Ferrous bromide | 80 |

The coupling reactors operate at a temperature of 160°C. and the product from the last reactor is as follows:

| Component | Mols/hr |
|---|---|
| Acrylonitrile | 325 |
| Propionitrile | 5267 |
| 3-bromopropionitrile | 632 |
| Copper | 27 |
| Cuprous bromide | 711 |
| Ferrous bromide | 80 |
| Adiponitrile | 288 |

The coupling product is fed to a flash drum, which serves to remove a portion of the low boiling components. The flash drum effluent has the following composition:

| Component | Mols/hr |
|---|---|
| Acrylonitrile | 160 |
| Propionitrile | 2590 |
| 3-bromopropionitrile | 632 |
| Copper | 27 |
| Cuprous bromide | 711 |
| Ferrous bromide | 80 |
| Adiponitrile | 288 |

This stream is fed to a distillation column containing 15 sieve trays. The feed enters the column at the sixth tray from the bottom. The column reboiler operates at a pressure of 250 mm Hg and a temperature of 200°C. Acrylonitrile is injected into the reboiler so that the concentration of acrylonitrile in the bottoms stream is 1 mol per 100 mols 3-bromopropionitrile. Of the 3-bromopropionitrile fed to this column, 316 mols/hour are removed overhead. The bottoms from this first 3-bromopropionitrile column are fed to the sixth tray from the bottom of a second 3-bromopropionitrile column, which also contains 15 sieve trays. Acrylonitrile is fed to the 3rd tray from the bottom such that the overhead, which contains essentially all of the 3-bromopropionitrile in the feed, also contains 1 mol acrylonitrile/100 mols 3-bromopropionitrile. The reboiler temperature is 260°C. and the pressure is 75 mm Hg.

The overheads from the two 3-bromopropionitrile columns are combined and recycled to the coupling reactors.

I claim:

1. A method of purifying a haloalkyl cyanide having the formula $X-CH_2CRCN$ and produced from a nitrile of the formula $CH_2=CRCN$, wherein R is hydrogen or a lower alkyl, and X is a chloro-, bromo-, or iodo- group which comprises distilling said haloalkyl cyanide while maintaining a concentration of at least 1 mol of $CH_2=CRCN$ per 100 mols of the haloalkyl cyanide in the distillation zone during said distillation by adding said $CH_2=CRCN$ to said distillation zone substantially throughout said distillation in sufficient quantity to maintain said concentration of at least 1 mol of $CH_2=CRCN$ per 100 mols of said haloalkyl cyanide, and recovering said haloalkyl cyanide.

2. The process of claim 1 wherein said haloalkyl cyanide is 3- halopropionitrile and acrylonitrile is the compound maintained in said distillation zone.

3. The process of claim 2 wherein acrylonitrile is added continuously to the distillation zone in amounts sufficient to maintain a concentration thereof of from 1 to 5 mols for each 100 mols of the haloalkyl cyanide.

4. The process of claim 1 wherein the haloalkyl cyanide to be purified is obtained by the hydrohalogenation of $CH_2=CRCN$.

* * * * *